United States Patent
Nolan et al.

(10) Patent No.: US 6,837,482 B2
(45) Date of Patent: Jan. 4, 2005

(54) SEALING ARRANGEMENT FOR THERMALLY ENHANCED SEALING

(75) Inventors: Brian Nolan, Mason, OH (US); Steven M. Kirk, Cincinnati, OH (US)

(73) Assignee: Xomox Corporation, Cincinnati, OH (US)

( * ) Notice: Subject to any disclaimer, the term of this patent is extended or adjusted under 35 U.S.C. 154(b) by 104 days.

(21) Appl. No.: 09/811,961

(22) Filed: Mar. 19, 2001

(65) Prior Publication Data

US 2002/0130292 A1 Sep. 19, 2002

(51) Int. Cl.[7] .............................. F16K 5/06; F16K 27/06
(52) U.S. Cl. .................. 251/315.14; 277/614; 277/931
(58) Field of Search ...................... 251/315.1, 315.13, 251/315.14; 277/608, 614, 931

(56) References Cited

U.S. PATENT DOCUMENTS

| | | | | |
|---|---|---|---|---|
| 3,184,213 A | * | 5/1965 | Anderson | 251/315.12 X |
| 3,226,082 A | * | 12/1965 | Gulick et al. | 251/355 |
| 3,731,904 A | * | 5/1973 | Valince | 251/315.13 |
| 4,068,822 A | * | 1/1978 | Richards | 251/315.14 |
| 4,134,595 A | * | 1/1979 | Melville | 251/315.14 X |
| 4,273,148 A | * | 6/1981 | Charland | 277/931 X |
| 4,418,887 A | * | 12/1983 | Tubaro | 251/315.14 X |
| 4,556,197 A | * | 12/1985 | Kindersley et al. | 251/315.14 X |
| 4,911,409 A | * | 3/1990 | Oliver et al. | 251/315.14 X |
| 4,928,921 A | * | 5/1990 | Steele | 251/315.13 X |
| 5,104,092 A | * | 4/1992 | Block et al. | 251/315.13 X |
| 5,326,074 A | | 7/1994 | Spock, Jr. et al. | |
| 5,901,944 A | | 5/1999 | Ramakrishnan et al. | |
| 6,129,336 A | | 10/2000 | Sandling et al. | |

\* cited by examiner

*Primary Examiner*—Eric Keasel
(74) *Attorney, Agent, or Firm*—Frost Brown Todd LLC

(57) ABSTRACT

A sealing arrangement and method are disclosed for enhancing a seal in response to conditions of changing temperature. An annular seal is disposed in an annular sealing cavity, with the seal and the cavity having different changes in dimensions in response to a temperature changes. The sealing cavity has a radially outwardly positioned end portion that converges radially outward and a radially inwardly positioned end portion that converges radially inward. Differential changes in the dimensions of the sealing cavity and the sealing member force the sealing material to wedge into one of the converging end portions to enhance the sealing relationship.

31 Claims, 3 Drawing Sheets

SEALING ARRANGEMENT FOR THERMALLY ENHANCED SEALING

TECHNICAL FIELD

The invention relates generally to fluid seals and more particularly to sealing arrangements adapted for use in thermally varying environments. The invention will be specifically illustrated in connection with a joint seal of a valve that is subjected to thermal cycling.

BACKGROUND OF THE INVENTION

In many industrial applications valves and other fluid handling components are subjected to varying temperature conditions. In some situations, for example, valves and other fluid components are thermally cycled through extreme temperatures ranging from elevated temperatures of several hundred degrees Fahrenheit to very low temperatures of 40 degrees Fahrenheit below zero or lower. Among other significant problems resulting from such extreme changes in temperature is the maintenance of fluid seals at the joints of fluid handling components. Valves and other fluid containment components frequently are formed of metals. Sealing materials used at the joints of such components, however, frequently are formed on non-metallic material. Depending upon the material from which the sealing material is formed, the coefficients of thermal expansion and contraction for the sealing material frequently is substantially different than the thermal coefficient of expansion and contraction of the fluid handling or containment components. As a consequence of these differences in the coefficients of thermal expansion, the sealing relationship between the sealing material and the components often is lost or compromised. Many conventional sealing materials, such as graphite, have coefficients of thermal expansion that are less than the coefficients of the material of the components they are used to seal.

Many times, the fluids being handled in applications involving conditions of extreme thermal cycling are highly corrosive. When such is the case, many of the conventional elastomer materials used for sealing, such as rubber, are unacceptable, since the corrosive fluids will often attack the sealing material. In such situations, seals often are formed of fluorinated hydrocarbon polymers, such as polytetrafluoroethylene. Many of these fluorinated hydrocarbon polymers are inert to virtually all chemical media and are suitable for use with a wide range of corrosive fluids. Fluorinated hydrocarbon polymers have a high coefficient of thermal expansion relative to the metal materials used for most valves, fluid containment devices and related components.

Regardless of whether the coefficients of the sealing material are greater than or less than the materials of the components the sealing material is used to seal, any substantial difference in the thermal expansion or contraction rates generally creates problems with the seal integrity when the components are subjected to thermal cycling. These complications are, of course, compounded considerably when the thermal cycling occurs between temperature extremes.

SUMMARY OF THE INVENTION

A thermally assisted sealing arrangement is provided that includes a fluid containment member and a joining structure adapted to interface with said fluid containment member. The fluid containment member and the joining structure cooperate to form an annular sealing cavity that is interposed between the fluid containment member and the joining structure. The sealing cavity has a central portion and two end portions. One of the end portions is disposed radially inward of the central portion with the other end portion being disposed radially outward of the central portion. Each of the end portions of the cavity are configured to converge in a direction away from the central portion of the cavity. An annular sealing member is disposed in the sealing cavity. The sealing member is operative to change radial dimension in response to temperature changes by an amount that is substantially different than the change of radial dimension of the cavity in response to temperature changes. With the above construction, a change in temperature will tend to cause the sealing member to move radially relative to the cavity into one of the converging end portions of the cavity and to enhance the sealing pressure between the sealing member and the end portion of the cavity. The invention has utility in connection with any fluid containment members that are sealingly joined. In its most preferred form, the invention can be used for sealing the interface of a valve.

In one preferred form of the invention, the annular sealing member has a coefficient of thermal expansion that is substantially different than the coefficient of thermal expansion of the cavity. Such differences in the coefficients of thermal expansion result in the differential changes in radial dimension of the sealing member and the cavity.

In one particularly useful form of the invention, the coefficient of thermal expansion of the sealing member is greater than the coefficient of thermal expansion of the cavity.

According to another aspect of the invention, the containment member and the joining structure cooperate to compressingly engage the interposed sealing member and to urge the sealing member from a preformed cross-sectional shape to cross-sectional shape corresponding to the shape of the cavity. The compression of the sealing member causes material from the sealing member to flow into the converging end portions of the sealing cavity.

Different combinations of materials and structures may be used to achieve the differential dimensional change in response to temperature change. In one preferred form of the invention, the sealing member may be formed of a fluorinated hydrocarbon polymer material, such as polytetrafluoroethylene, and the containment structure and joining structure may be formed of metal. Alternatively, the fluid containment member and the joining structure may be formed of plastic.

In the preferred form of the invention, the annular sealing cavity formed by the fluid containment member and joining structure has a diamond-shaped cross-sectional area that is substantially consistent cross-sectional shape throughout its circumference.

According to a further aspect of the invention, clearance gaps are provided at opposite ends of the sealing cavity and the converging end portions of the cavity converge to and communicate with the clearance gaps. The annular sealing member extends at least partially into the clearance gaps at each end of the sealing cavity.

According to another aspect of the invention, a method of sealing an interface between two components is provided. The method includes providing between the two components an annular cavity with a first predetermined cross-sectional shape that includes a central portion and two end portions. One of the end portions is radially inward of the central portion and the other end portion is radially outward of the central portion. Each of said end portions is configured to converge in a direction away from the central portion. An annular sealing member having a second predetermined cross-sectional shape that differs from the first predetermined cross-sectional shape is interposed into the cavity. The sealing member is formed of a material having a coefficient of thermal expansion that differs from the coefficient of thermal expansion of the cavity. The two components are moved toward each other to compressingly engage the interposed sealing material and force material of the sealing material to flow into the converging end portions of the cavity so that differential rates of thermal expansion and contraction between the sealing material and the cavity will wedge the sealing material into the converging end portions of the cavity.

The method also may include extruding sealing material into clearance gaps at opposite ends of the sealing cavity.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION OF THE PREFERRED EMBODIMENT

Figure 1:
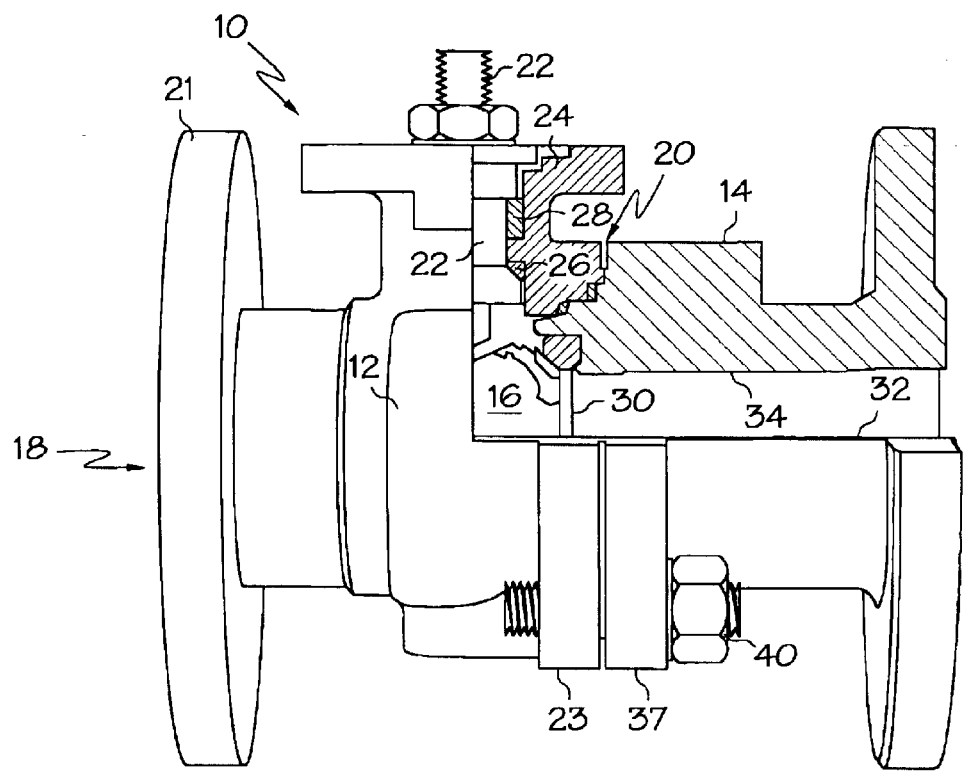
FIG. 1 is an elevational view, partially cross-section, of a valve utilizing the sealing arrangement constructed in accordance with the principles of the present invention.
Figure 2:
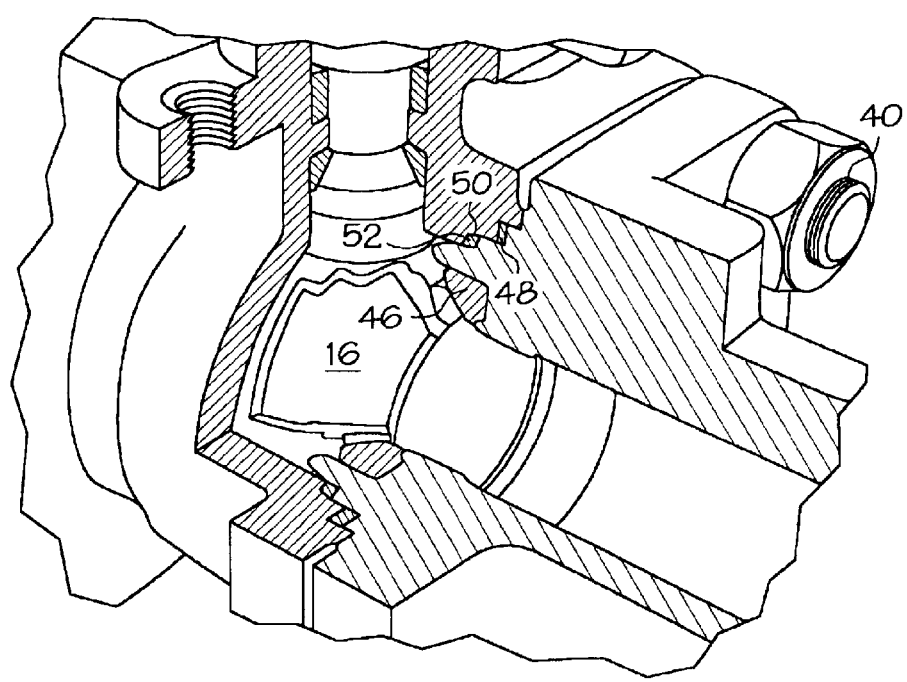
FIG. 2 is a perspective view of the valve and sealing arrangement depicted in FIG. 1.

Turning now to the drawings, FIGS. 1 and 2 show a fluid containment member 10. As specifically illustrated, the fluid containment member is shown as a body 12 of a ball valve, which body 12 is connected to a joining structure 14. The valve body has an inlet 18, and outlet 20 and a flow path extending between inlet 18 and outlet 20. A first flange 21 extends surrounds and extends radially outwardly (relative to the flow path) from the inlet 18, and a second flange 23 surrounds the outlet 20 and extends radially outwardly from the outlet 20, the radial extension of the first flange 21 exceeding the radial extension of the second flange 23.

A valving member 16 is disposed with the body for controlling the flow of a process media between the inlet 18 and outlet 20 of the valve body. In the illustrated embodiment, the valving member 16 has a generally spherical shape, and is connected to a valve stem 22 that extends from the valving member 16 to a location outside the valve body through a stem port 24. The valving member 16 is rotatably movable within the valve body about a axis coincident with the axis of the stem 22 with which it is mechanically interconnected. Seals 26 and 28 circumscribe the valve stem 22 at selected axial locations of the valve stem 22 and are positioned between the valve stem and the stem port 24 to minimize any leakage of the fluid media in the space between the stem 22 and stem port 24.

The valving member 16 has a through passageway (not shown) that is brought into and out of registry with the flow path of the valve body as the valving member is rotated about its rotational axis. An actuator, not shown, may be used to rotate the valve stem 22, which rotation further effectuates rotation of the valving member 16 due to the mechanically interconnection between the valving member 16 and the valve stem 22. In commercial application, the actuator used to rotate the valve stem 22 may be a manually activated handle, or any of a number of automated actuators, such as actuators driven by electricity, pressurized fluid, springs or the like. When the valve 10 is in its open position, the through passageway in the valving member 16 is aligned with the valve body flow path, and fluid communication exists between the inlet 18 and the outlet 20 thereby allowing a fluid media to flow through the valve 10. Conversely, when the valve is in its closed position, the valving member 16 is rotated 90 degrees from the fully open position, placing the through passageway in the valving member 16 out of alignment with the valve body flow path and thus blocking fluid media flow between the inlet 18 and outlet 20. Such rotational movement of the valving member 16 is achieved by a 90 degree rotation of an actuator (not shown), which rotation is translated to the valve stem 22 which in turn rotates the valving member 16.

The joining structure 14 specifically shown in the illustrated embodiment is a ball valve tail section. This tail section includes an inlet 30 and outlet 32 with a flow passage 34 extending therebetween. A third flange 35 surrounds and extends radially outwardly (relative to the flow passage 34) from the outlet 32, and a fourth flange 37 extends radially outwardly from the tail section inlet 30. As shown, the radial extension of the third flange 35 corresponds to the radial extension of the first flange 21, and the radial extension of the fourth flange 37 corresponds to the radial extension of the second flange 23. Flanges 21 and 32 of the valve body 12 and tail section 14 respectively each have a plurality of bolt holes and are adapted for attachment to mating flanges (not shown) of a pipe or other fluid containment member.

The flange 37 of the tail section 14 is joined to flange 23 of the valve body 12 by four bolts 40, which bolts 40 extend through matching aligned holes extending through the flanges 23, 37. When the valve body 12 and the tail section 14 are joined, a valve seat 46 secured by the tail section 14 is positioned in proximity with the valving member 16. In addition, the generally complimentary configurations of the outboard end of flange 23 and the inboard end of flange 37 cooperate to form two annular cavities circumscribing the media flow path, a first annular cavity 48 having a generally rectangular cross-sectional shape and a second sealing cavity 50 having a generally diamond-shaped cross-sectional shape. An annular seal 54 is shown in the first annular cavity 48 and an annular seal 52 is shown in the second annular cavity 50.

Figure 3:
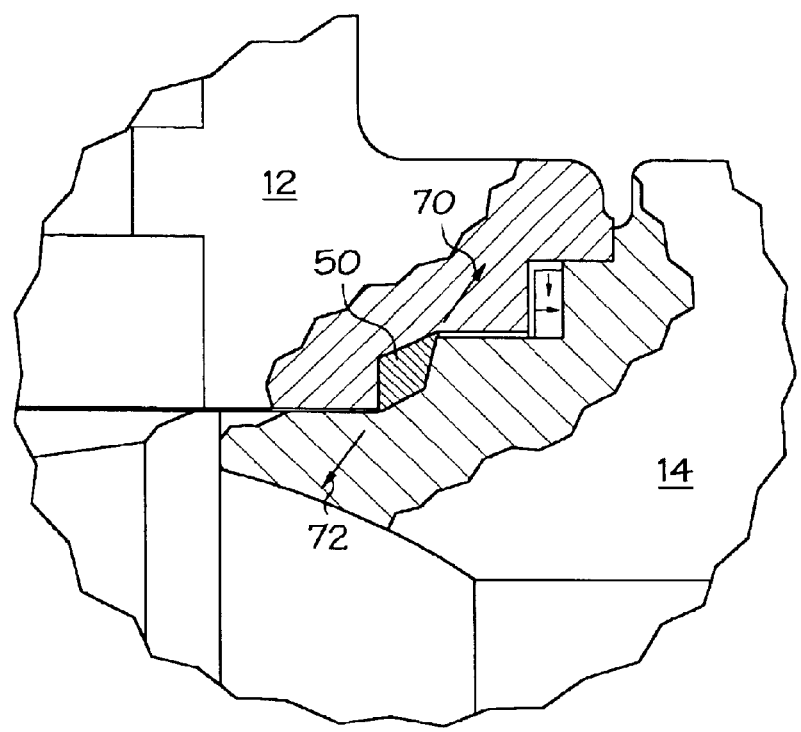
FIG. 3 is a cross-sectional view of an annular sealing cavity and an interface gap between the body and the tail section of the valve depicted in FIGS. 1 and 2 showing illustrating the annular sealing arrangement in greater detail.
Figure 3A:
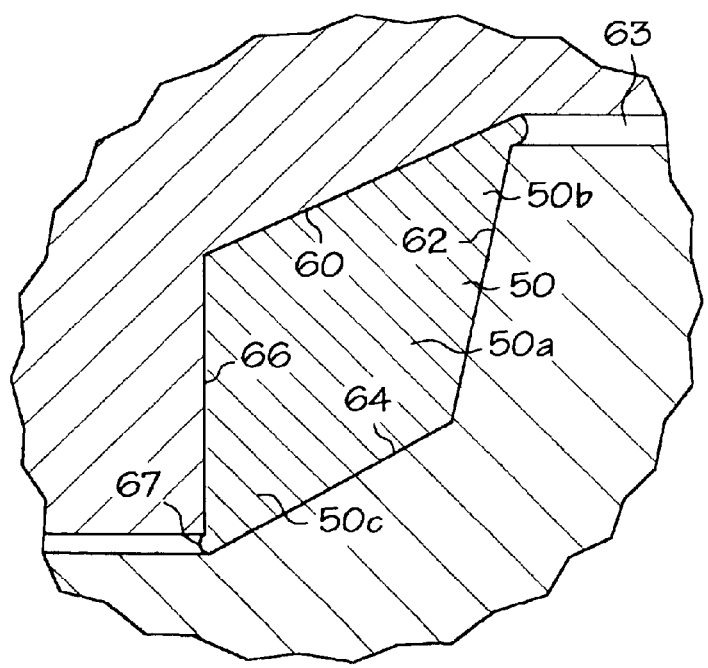
FIG. 3a is an enlargement of the annular sealing cavity of FIG. 3 showing clearance gaps at the opposite radial ends of the cavity.

Turning now to FIGS. 3, and 3A the second annular sealing cavity 50 and the annular seal 52 in that cavity are shown in greater detail. This annular cavity 50, which is configured in accordance with the principles of the present invention, has three distinct portions, a central portion 50a and two end portions 50b and 50c. Significantly, the end portion 50b is positioned radially outwardly of the central portion 50a and the end portion 50c is positioned radially inwardly of the central portion 50a. The radially outwardly disposed end portion 50b is defined by two generally planar walls 60 and 62 that tend to converge as they extend in a radially outward direction. The walls 60 and 62 extend radially outwardly and terminate at a clearance gap 63 on the radially outward side of the cavity 50, between the fluid containment members 12 and 14. In a similar manner, the radially inwardly disposed end portion 50c is defined by two generally planar walls 64 and 66 that are configured to so as to tend to converge as they extend in a radially inward direction. The walls 64 and 66 extend radially inwardly and terminate at a clearance gap 67 on the radially inward side of the cavity 50.

As best shown in FIG. 3a, the annular sealing member 52 that is contained within annular cavity generally completely fills the entire cavity 50 and has a cross-sectional shape generally conforming to the shape of the cavity 50, with small some material from the sealing member 52 being extruded into the clearance gaps 63 and 67. In the preferred form of the invention, the cross-sectional shape of the cavity 50, as well as the cross-sectional shape of the annular sealing member 52 contained within the cavity, is substantially consistent through the entire circumferential expanse of the cavity 50 and sealing member 52.

In accordance with one of the principles of the present invention, the sealing member 52 changes in radial dimension in response to temperature changes by an amount that is substantially different than the change in radial dimension of the cavity 50. In one preferred form of the invention, the fluid containment members being joined, such as the valve body 12 and valve tail section 14, are formed of an alloyed steed or other metal, and the sealing member 52 is formed of a florinated hydrocarbon polymer, such as polytetrafluoroethylene ("PTFE"), fluorinated ethylene propylene ("FEP"), or perfluoroalkoxy ("PFA"). With such a combination of materials, the sealing member 52 would have a relatively high coefficient of thermal expansion relative to the materials forming the cavity 50, and the sealing member 52 would expand, and thus increase in radial dimension by an amount greater than the cavity, in response to an increase in temperature.

If other types of sealing materials are used, such as graphite, ceramics, powdered metals, high temperature plastics, the cavity 50 may expand in response to an increase in temperature by an amount greater than the sealing material. Graphite, for example, has a coefficient of thermal expansion and contraction that is substantially less than most metals likely to be used for containment members. Thus, if the cavity 50 is formed by joined components made of metallic material, and the sealing member 52 is formed of graphite, the sealing material 52 will tend to expand substantially less than the cavity 50 in response to an increase in temperature. The containment member need not be metal, however, as the invention contemplates the sealing cavities formed by joined components made of various types of plastic materials. The principles of the invention, however, work whenever the cavity 50 and the sealing member 52 undergo a substantial change radial dimension in response to a temperature change, regardless as to whether the cavity or the sealing member undergoes the greatest amount of dimensional change. As used in the present specification and claims, the term "substantial," as used in connection with a difference in dimension, means by an amount sufficient to affect the integrity of the sealing relationship between the cavity and the sealing member.

With specific reference to FIGS. 3 and 3a, it will be seen that the geometric configuration of the sealing cavity 50 and the differential change in radial dimension of the sealing member 52 relative to the cavity 50 may be used to enhance the effectiveness of the sealing member 52. In the embodiment illustrated, the sealing cavity 50 is jointly formed by the first containment member 12 (the valve body) and the joining structure (the valve tail in the specifically illustrated embodiment), both of which are formed of metal. The sealing member is formed of a florinated hydrocarbon polymer, such as polytetrafluoroethylene ("PTFE"), fluorinated ethylene propylene ("FEP"), or perfluoroalkoxy ("PFA"), which have a coefficient of thermal expansion and contraction that is substantially greater than that of the metal. As a consequence of these material properties, the sealing member 52 tends to expand radially relative to the cavity 50 in response to an increase in temperature. This relative increase in radial dimension of the sealing member 52 tends to urge the sealing member 52 radially outward in the direction of arrow 70 and force material from the sealing member 52 to wedge into the most radial outward of the cavity end portions 50b formed by converging wall sections 60 and 62. This wedging action, of course, increases the contact force between the sealing member 52 and the converging walls 60 and 62, thereby enhancing the sealing relationship between sealing member 52 and sealing cavity 50.

The effectiveness of the invention to enhance sealing relationship also is achieved when the cavity and sealing member are subject to a decrease in temperature. Under conditions of decreasing temperature, the sealing member 52 (formed of a fluorinated hydrocarbon polymer in the described example) tends to contract in the radial dimension by an amount greater than thermally induced reduction of radial dimension of the cavity 50 (formed by the metal containment members). This decrease in the radial dimension of the sealing member 52 relative to the cavity 50 tends to urge the sealing member 52 radially inward in the direction of arrow 72 and force material from the sealing member 52 to wedge into the most radial inward of the cavity end portions 50c formed by converging wall sections 64 and 66. Similar to the outward wedging action described above of end portion 50b in response to increased temperature, this radial inward wedging action increases the contact force between the sealing member 52 and the radially inward converging walls 64 and 66, thereby enhancing the sealing relationship between sealing member 52 and sealing cavity 50. Hence, the differential change in radial dimension between the sealing cavity and the sealing member is used to enhance the sealing relationship in both conditions of heating and in conditions of cooling.

The change in radial dimension of the sealing member relative to the sealing cavity in response to temperature may result as a function of the inherent properties of the materials used, as for example, the differential rates of thermal expansion or contraction discussed above. It also may result from construction of the sealing member. For example, the sealing member 52 described above could have an annular cavity filled with a gas or a jell substance that would expand or contract in response to temperature differences, and the expansion or contraction of that gas or jell could be used to change the radial dimension of the sealing member relative to the cavity 50.

Figure 4:
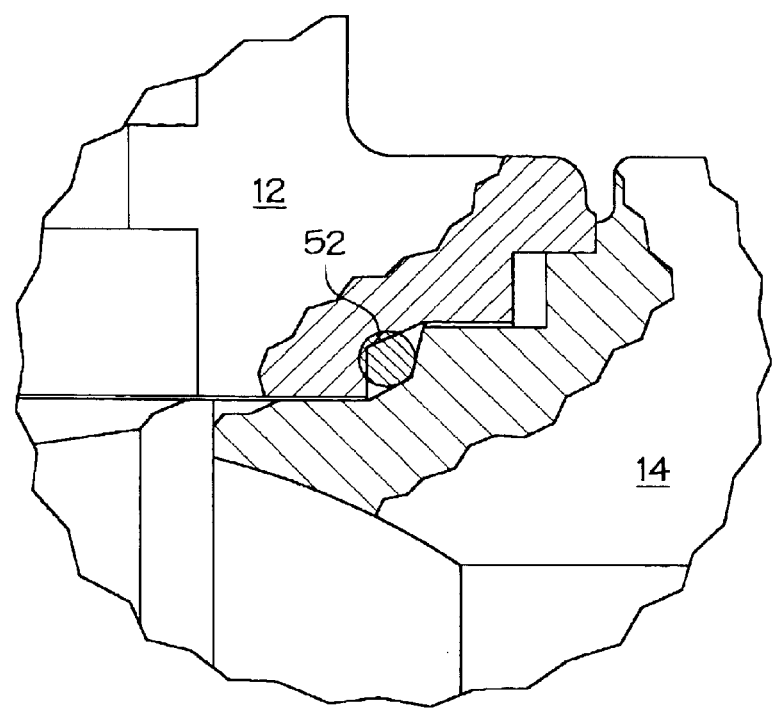
FIG. 4 is a cross-sectional view similar to the view of FIG. 3, but schematically depicting an annular sealing member with a circular cross-sectional shape from which the annular sealing member of FIGS. 1–3 could be formed.
Figure 5:
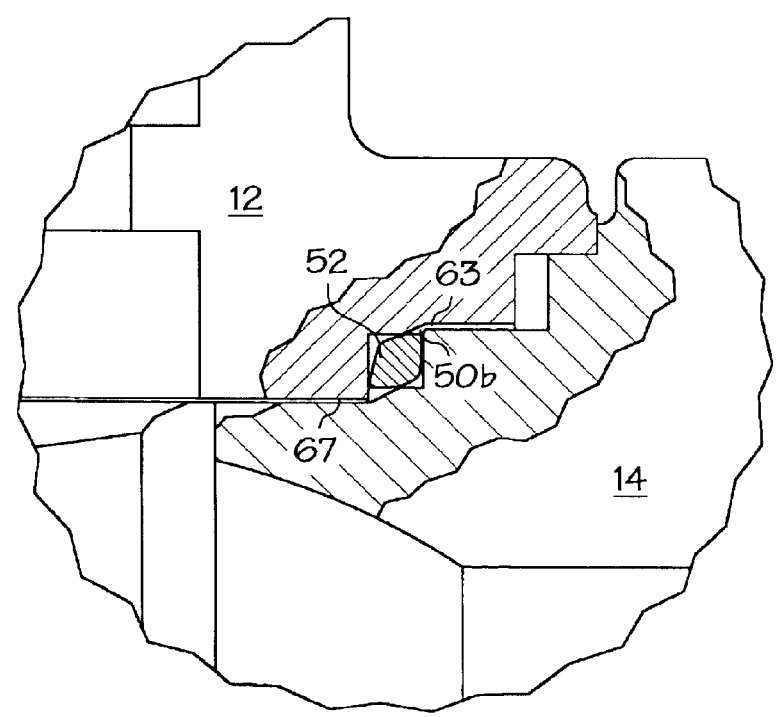
FIG. 5 is a cross-sectional view similar to FIG. 4, but schematically showing an annular sealing member of a different cross-sectional shape from which the annular sealing member of FIGS. 1–3 could be formed.

In accordance with another aspect of the invention, the cross-sectional shape of the sealing member 52 is at least partially formed by compression of the containment member 12 (valve body in the illustrated embodiment) and joining member 14 (tail section as illustrated). Referring now to FIG. 4, the sealing member 52 is shown with a cross-sectional shape it might have before being compressed by the two members forming the sealing cavity, the valve body 12 and tails section 14 in the illustrated embodiment, a circular cross-sectional shape that differs from the diamond-shaped cross-sectional shape of the cavity 50. As illustrated, the circular cross-sectional shape of the sealing member 52 has dimensions in various directions that do not fit into the cavity 50. When the sealing member 52 of circular cross-sectional shape if interposed into the cavity 50, and the valve body 12 and tail section 14 are moved toward each other to compressingly engage the circular sealing member 52, material from the sealing member 52 is forced to flow into the opposite end portions of the cavity 50 formed respectively by converging walls 60,62 and 64,66. FIG. 5 is similar to FIG. 4, except that the pre-compressed cross-sectional shape of the sealing member 52 is in the form parallelogram, either rectangular, square or rhombus.

While the cross-sectional shape of the pre-compressed sealing member 52 need not match the cross-sectional shape of the cavity 50, it is desirable to match the amount of material in the pre-compressed sealing member 52 with the volume available in the cavity 50. In order to maximize the effectiveness of the sealing arrangement of the invention, the entire volume of the sealing cavity should be filled with sealing material. In fact, it may be desirable to place into the sealing cavity a pre-compressed sealing member 52 having a volume of material that slightly exceeds the volume of the sealing cavity 50. When this occurs, a small amount of sealing material is extruded out of the cavity into the clearance gaps 63 and 67 at the respective radial outward and radial inward ends of the cavity 50. Such extrusion into the clearance gaps both assures that there is adequate sealing material in the cavity 50 to wedge into the end portions in response to temperature changes, and also serves to seal the clearance gaps 63, 67.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the amended claims.

What is claimed is:

1. A thermally assisted sealing arrangement, comprising:
   (a) a fluid containment member;
   (b) a joining structure adapted to interface with said fluid containment member, said fluid containment member and said joining structure cooperating to form an annular sealing cavity interposed between said fluid containment member and said joining structure, said sealing cavity having a central portion and two end portions, one of the end portions being radially inward of the central portion with the other end portion being radially outward of the central portion, each of said end portions of the cavity being configured to converge in a direction away from the central portion;
   (c) an annular sealing member disposed in said sealing cavity, said sealing member being operative to change radial dimension in response to temperature changes by an amount that is substantially different than the change of radial dimension of the cavity in response to temperature changes; and
   (d) clearance gaps at opposite ends of the sealing cavity wherein the converging end portions of the cavity converge to and communicate with the clearance gaps, the annular sealing member extending at least partially into the clearance gaps at each end of the sealing cavity. whereby a change in temperature will tend to cause the sealing member to move radially relative to the cavity into one of the converging end portions of the cavity and enhance the sealing pressure between the sealing member and the end portion of the cavity.

2. A thermally assisted sealing arrangement as recited in claim 1 wherein the fluid containment member and the joining structure cooperate to compressingly engage the interposed sealing member and to urge the sealing member from a preformed cross-sectional shape to a cross-sectional shape corresponding to the shape of the cavity.

3. A thermally assisted sealing arrangement as recited in claim 1 wherein the fluid containment member and the joining structure compressingly engage the interposed sealing member to urge material from the sealing member to flow into the converging end portions of the sealing cavity.

4. A thermally assisted sealing arrangement as recited in claim 1 wherein the annular sealing member has a coefficient of thermal expansion that is substantially different than the coefficient of thermal expansion of the cavity and whereby such differences in the coefficients of thermal expansion result in the differential changes in radial dimension of the sealing member and the cavity.

5. A thermally assisted sealing arrangement as recited in claim 4 wherein the coefficient of thermal expansion of the sealing member is greater than the coefficient of thermal expansion of the cavity.

6. A thermally assisted sealing arrangement as recited in claim 5 wherein the sealing member tends to move radially outwardly relative to the cavity in response to an increase in temperature to wedge material of the sealing member into the radially outwardly converging portion of the cavity and wherein the sealing member tends to move radially inwardly relative to the cavity in response to a decrease in temperature to wedge material from the sealing member into the radially inwardly converging portion of the cavity.

7. A thermally assisted sealing arrangement as recited in claim 5 wherein the fluid containment member and joining structure are formed of metal.

8. A thermally assisted sealing arrangement as recited in claim 5 wherein the fluid containment member and the joining structure are formed of plastic.

9. A thermally assisted sealing arrangement as recited in claim 5 wherein the sealing member is formed of a fluorinated hydrocarbon polymer material.

10. A thermally assisted sealing arrangement as recited in claim 9 wherein the sealing member is fanned of polytetrafluoroethylene.

11. A thermally assisted sealing arrangement as recited in claim 1 wherein the annular sealing cavity formed by the fluid containment member and joining structure has a diamond-shaped cross-sectional area.

12. A thermally assisted sealing arrangement as recited in claim 11 wherein the annular sealing member has a substantially consistent cross-sectional shape throughout its circumference.

13. A thermally assisted sealing arrangement as recited in claim 12 wherein the cross-sectional shape of the annular sealing member is circular.

14. A thermally assisted sealing arrangement as recited in claim 12 wherein the cross-sectional shape of the annular sealing member is a rhombus.

15. A thermally assisted sealing arrangement as recited in claim 12 wherein the cross-sectional shape of the annular sealing member is rectangular.

16. A thermally assisted sealing arrangement as recited in claim 15 wherein the cross-sectional shape of the annular sealing member is square.

17. In combination with a valve, a thermally assisted sealing arrangement, comprising:
   (a) a valve body, said valve body having an inlet, a outlet and a first fluid flow passage extending between the inlet and the outlet;
   (b) a joining structure interfacing with said valve body, said joining structure having a second flow passage, said first and second flow passages being in fluid communication with each other to form a fluid flow path, said valve body and said joining structure cooperating to form an annular sealing cavity circumferentially disposed about the flow path and interposed between said valve body and said joining structure, said sealing cavity having a central portion and two end portions, one of the end portions being radially inward of the central portion with the other end portion being radially outward of the central portion, each of said end portions of the cavity being configured to converge in a direction away from the central portion; and
   (c) an annular sealing member disposed in said sealing cavity, said sealing member having a thermal coefficient of expansion that is substantially different than the thermal coefficient of expansion of the sealing cavity; and
   (d) clearance gaps at opposite ends of the sealing cavity wherein the converging end portions of the cavity converge to and communicate with the clearance gaps, the annular sealing member extending at least partially into the clearance gas at each end of the sealing cavity.
whereby differential temperature induced dimensional changes of the sealing member relative to the cavity will urge the sealing member to move radially relative to the cavity into one of the converging end portions of the cavity thereby tending to enhance the sealing pressure between the sealing member and the end portion of the cavity.

18. A thermally assisted sealing arrangement as recited in claim 17 wherein the valve body and the joining structure cooperate to compressingly engage the interposed sealing member and to urge the sealing member from a preformed cross-sectional shape to a cross-sectional shape corresponding to the shape of the cavity.

19. A thermally assisted sealing arrangement as recited in claim 17 wherein the valve body and the joining structure compressingly engage the interposed sealing member to urge material from the sealing member to flaw into the converging end portions of the sealing cavity.

20. A thermally assisted sealing arrangement as recited in claim 17 wherein the annular sealing cavity formed by the valve body and joining structure has a diamond-shaped cross-sectional area.

21. A thermally assisted sealing arrangement as recited in claim 17 wherein the sealing member tends to move radially outwardly relative to the cavity in response to an increase in temperature to wedge material of the sealing member into the radially outwardly converging portion of the cavity and wherein the sealing member tends to move radially inwardly relative to the cavity in response to a decrease in temperature to wedge material from the sealing member into the radially inwardly converging portion of the cavity.

22. A thermally assisted sealing arrangement as recited in claim 21 wherein the sealing member is formed of polytetrafluoroethylene.

23. A thermally assisted sealing arrangement as recited in claim 17 wherein the coefficient of thermal expansion of the sealing member is greater than the coefficient of thermal expansion of the cavity.

24. A thermally assisted sealing arrangement as recited in claim 23 wherein the sealing member is formed of fluorinated hydrocarbon polymer material.

25. A thermally assisted sealing arrangement as recited in claim 23 wherein the valve body and joining structure are formed of metal.

26. A thermally assisted sealing arrangement as recited in claim 23 wherein the waive body and the joining structure are formed of plastic.

27. A thermally assisted sealing arrangement as recited in claim 23 wherein the annular sealing member has a substantially consistent cross-sectional shape throughout its circumference.

28. A thermally assisted sealing arrangement as recited in claim 27 wherein the cross-sectional shape of the annular sealing member is circular.

29. A thermally assisted sealing arrangement as recited in claim 27 wherein the cross-sectional shape of the annular sealing member is rectangular.

30. A thermally assisted sealing arrangement as recited in claim 27 wherein the cross-sectional shape of the annular sealing member is square.

31. A thermally assisted sealing arrangement as recited in claim 27 wherein the cross-sectional shape of the annular sealing member is a rhombus.

* * * * *